C. L. STILES.

FEED GAGE FOR PRINTING PRESSES.

APPLICATION FILED SEPT. 9, 1920.

Reissued Oct. 19, 1920.

14,963.

Inventor

CHARLES L. STILES

By C. C. Shepherd

Attorney

UNITED STATES PATENT OFFICE.

CHARLES L. STILES, OF COLUMBUS, OHIO.

FEED-GAGE FOR PRINTING-PRESSES.

14,963. Specification of Reissued Letters Patent. Reissued Oct. 19, 1920.

Original No. 1,321,569, dated November 11, 1919, Serial No. 301,475, filed June 3, 1919. Application for reissue filed September 9, 1920. Serial No. 409,237.

*To all whom it may concern:*

Be it known that I, CHARLES L. STILES, a citizen of the United States, residing at Columbus, in the county of Franklin and State of Ohio, have invented a new and useful Improvement in Feed-Gages for Printing-Presses, of which the following is a specification.

The present invention relates to an improved feed gage or gage pin, for use in connection with platen printing presses, wherein the tympan sheet is employed on the platen of the press and the gage pin is inserted or secured in the sheet, to facilitate the feeding of the sheets to be printed to the press and regulate and maintain the proper position of the sheets to be printed as they are presented to the type.

The primary object of the invention is to improve the construction of the devices of this character in certain particulars of construction, to render the device more durable and better braced when pinned or secured to the tympan sheet by the prong entered therein: to render more stable the adjustable slide tongue so that it will remain in its fixed position without likelihood of disarrangement and to so construct the gage head as to prevent the tongue being moved to such position as to endanger the tension feet, during the action of the platen, and to this end the invention resides in certain novel combinations and arrangements of parts as hereinafter more specifically described and claimed.

In the accompanying drawings one complete example of the physical embodiment of the invention is illustrated, and in addition, a modified form of the invention is depicted, showing the best modes I have so far devised for the practical application of the principles of the invention.

Figure 1:
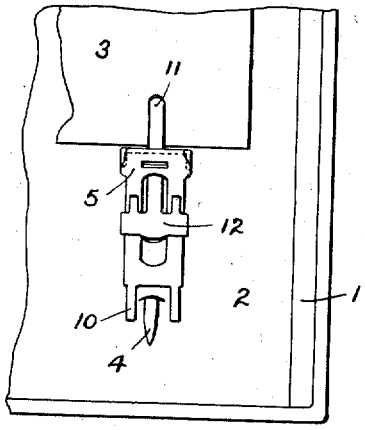
Figure 1 is a plan view showing a portion of the platen of the press with the tympan sheet and the feed gage secured thereto, the corner of a sheet to be printed also being shown.
Figure 2:
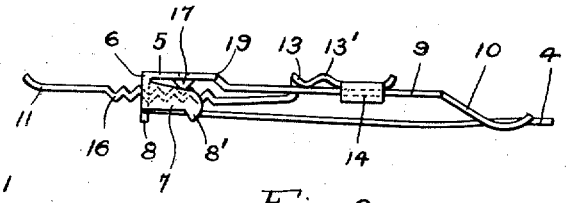
Fig. 2 is a side or edge view of the gage, detached.
Figure 3:
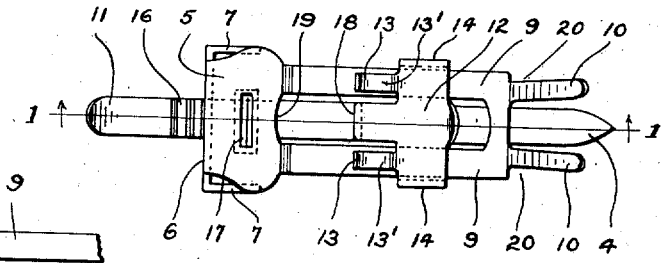
Fig. 3 is a plan view of the gage.
Figure 5:
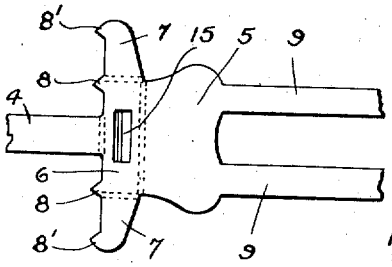
Fig. 5 is an enlarged view of a part of the blank from which the gage head, shanks and tongue are folded.
Figure 4:
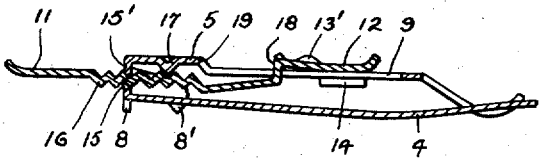
Fig. 4 is a sectional view of the gage on line 1—1 of Fig. 3.
Figure 6:
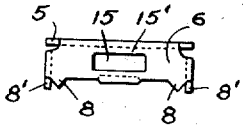
Fig. 6 is a front elevation of the gage head, with the tongue omitted.
Figure 7:
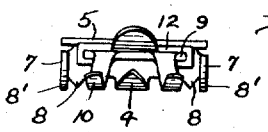
Fig. 7 is a rear elevation of the device.
Figure 8:
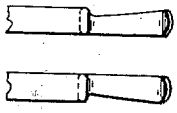
Fig. 8 illustrates a modified form of the shanks.
Figure 9:
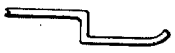
Fig. 9 is an edge view of one of the tension fingers of the shanks in Fig. 8.

In the preferred form of the invention as illustrated in the drawings I have shown sufficient portions of the platen 1, the tympan sheet 2, and a sheet to be printed as 3, to illustrate the application thereto of the gage which is secured by passing the sharpened end of the prong 4 through the tympan sheet as usual to hold the gage in position.

Sheet metal, as usual is employed in the construction of the two members of the gage, and the prong 4 is integral with the head indicated as a whole by the numeral 5, which has a vertical wall or wall perpendicular thereto indicated at 6 forming the gage for the sheets 3. The gage has lateral wings 7, 7, folded back at each side thereof, and four teeth 8, 8 and 8′ 8′ are fashioned on the wall 6 and the wings 7 respectively, the first pair of teeth being arranged transversely of the gage and the second pair being located longitudinally thereof, so that they may be embedded in the tympan sheet in such manner as to provide the best longitudinal bracing of the gage as well as the best transverse bracing of the gage, because of the fact that the longitudinal axes of the teeth, in pairs, are arranged at right angles. Thus between the prong 4 and the two pairs of teeth the gage is held firmly in position, and the separation of the teeth 8 and 8′ from the point of engagement of the prong with the tympan sheet permits the utilization of more material therebetween so that the paper sheet is less likely to tear or break. In this manner the chances of the gage becoming loosened or turned are eliminated and a more firm hold on the tympan sheet is secured.

The guide shanks 9 9 extend backwardly from the head and are fashioned with pressure finger 10, 10, as usual, which are resilient and adapted to be pressed firmly against the tympan sheet to brace the gage. In Figs.

8 and 9 a modified form of the fingers is shown, and the shanks are separated at their ends so that they may be spread apart to increase tension for holding the tongue 11 firmly in position. In either form of the invention the pressure fingers are designed to lie along each side of the point of the prong and press down on the outer surface of the tympan sheet where the prong projects through, to add firmness and stability to the bracing of the gage.

The adjustable slide tongue 11 projects from its body portion 12, which is formed with the projections or presser feet or tension feet 13, 13, frictionally engaging and slidable on the shanks 9 9, and at 14, 14 lateral guide flanges are provided on the body of the tongue to slide along the edges of the shanks when the tongue is being adjusted, and to retain the tongue in proper position. As stated in the objects, it is one of the features of the present invention to render more stable the adjustable sliding tongue, so that the latter will remain in fixed position, after adjustment, without likelihood of disarrangement, and this is accomplished by providing indentations 13′ in the feet 13, 13, which materally assist in enhancing the resiliency of said feet and enable the same to exercise a greater degree of pressure upon the guide shanks 9, whereby when the body portion 12 is adjusted longitudinally of said shanks, the same will be securely held in a frictional manner in connection therewith, and hence loss of adjustment on the part of said body portion will be rendered extremely unlikely.

The tongue projects through the slot 15 in the end wall of the gage head and at this point is fashioned with sharp corrugations forming rack teeth 16 that are engaged by the rib 17 stamped through the material of the gage head 5 and projecting from the under-side of the head. The wall 15′ of the slot 15 also engages these rack teeth, the wall and rib being adjusted with relation to the teeth so that they will engage complementary teeth, and the resiliency of the material of which the tongue is made tends to hold the tongue in contact with the wall edge 15′ and the rib, so that the tongue may be adjusted to proper position and will there be held firmly fixed, as desired. A shoulder 18 on the tongue co-acts with a shoulder 19 on the head at one end of the shanks 9 to form a stop to prevent the tension feet 13 being pushed over the head of the gage and becoming injured by the action of the pressman who often has occasion to tap the head gently to seat or embed the teeth 8 8 8′ 8′ in the tympan sheet. The rear ends of the shanks are notched at 20 20 to accommodate the flanges 14 of the tongue body when the parts are being assembled, and after the tongue is passed through the slot 15 the body of the tongue slides on the shanks to proper position.

What I claim is:

1. A feed gage comprising a slotted head having a rearwardly projecting prong and rearwardly projecting spaced shanks, a tongue having its forward free end projecting through the slot of the head and its rear end movable in the space between said shanks, said rear end of said tongue having a laterally enlarged body overlying the shanks and provided with extension feet projecting longitudinally along the upper surfaces of said shanks.

2. A feed gage comprising a slotted head having a rearwardly projecting prong and rearwardly projecting spaced shanks, a tongue having its forward free end projecting through the slot of the head and its rear end movable in the space between said shanks, said rear end of said tongue having a laterally enlarged body overlying the shanks and provided with extension feet projecting longitudinally along the upper surfaces of said shanks, said tongue also having a vertical shouldered portion forwardly of its said enlarged body to engage the said head at the forward end of the shanks.

3. A feed gage of the character described, comprising a transversely slotted gage head, having a shoulder, a transverse rib, and provided with a lengthwise prong, longitudinally extending shanks, a lengthwise adjustable tongue, having side flanges provided with tension feet engaging the shanks of the head, said tongue having a corrugated portion coöperating with the rib and with the head at one side of its slot and a shoulder formed on the tongue engageable with the head for the purpose described.

4. A feed gage comprising a slotted head having rearwardly projecting shanks and a tongue engaging portion forwardly of said shank, a lengthwise prong, and a corrugated tongue working through the slot and having a rear portion slidably engaging the shanks and provided with upper tension feet engaging the upper surface of the shanks to hold its corrugated portion upwardly against the tongue engaging portion of the head.

5. A feed gage comprising a slotted head having a rearwardly projecting prong and rearwardly projecting spaced shanks, a tongue having its forward free end projecting through the slot of the head and its rear end movable in the space between said shanks, said rear end of said tongue having a laterally enlarged body overlying the shanks, and extension feet projecting longitudinally from said body and disposed to frictionally engage the upper surfaces of said shanks, said feet being provided with indentations which operate to enhance the frictional grip between said feet and the upper surfaces of said shanks.

6. A feed gage comprising a slotted head having a rearwardly projecting prong and rearwardly projecting spaced shanks, a tongue having its forward free end projecting through the slot of the head, the rear end of said tongue being provided with a body portion disposed to slidably engage said shanks and to be adjustable longitudinally of the latter and curved resilient feet disposed to engage the upper surface of said shanks to maintain said body and the tongue thereof in their positions of adjustment with respect to said shanks.

CHARLES L. STILES.